3,210,155
PROCESS FOR TREATING ALUMINUM CONTAINING ORES
Lloyd A. Cagnolatti, Gonzales, and Karl B. Kellogg, A. Dyer Lafleur, and Harry I. Abboud, Baton Rouge, La., assignors to Ormet Corporation, a corporation of Delaware
Filed May 15, 1962, Ser. No. 194,781
7 Claims. (Cl. 23—141)

This invention relates to improvements in the Bayer process for production of alumina. More particularly, it relates to the recovery of relatively large quantities of chemicals which are otherwise consumed and converted to waste in the normal operation of the Bayer process.

The chemical basis for extraction of alumina from bauxite and other aluminous ores is described in U.S. Patent 2,522,605. As conventionally practiced on a commercial scale at this time the Bayer process involves the use of a causticization corresponding generally to that developed by Hall around 1900, and this is commonly referred to as an "inside causticization" for reasons stated in U.S. Patent 2,522,605. In accordance with this conventional practice a charge consisting of slaked lime, soda ash, and bauxite are introduced into a digester to produce caustic in the digester as well as to extract the alumina from the bauxite of the charge, and to convert it to sodium aluminate.

The Bayer process cycle, as conventionally used at the present time, is represented by a semi-continuous cycle in which the process fluid is formed in a digester and is then passed in turn to a filter press for removal of excess solids, to a cooler for formation of supersaturated solution and then to a precipitator for formation of purified solid hydrated aluminum oxide product. From the precipitator it proceeds to a classifier where the hydrated alumina product is removed and, after removal of product, the spent liquor is returned to the digester to complete the conventional Bayer cycle.

During this processing cycle a certain amount of the caustic present in the Bayer liquor is converted to sodium carbonate and this is essentially an undesirable ingredient of such liquor. To reconvert the sodium carbonate back to the more desirable sodium hydroxide, the liquor is treated with unslaked lime. This partial replenishment of the caustic concentration of the Bayer liquor by treatment with unslaked lime is a causticization carried out within the Bayer cycle and gives rise to the term "inside causticization."

Although this inside causticization is successfully employed in the conventional commercial operations it has several limitations and disadvantages among which are the following.

In the first place the causticization efficiency based on the percent sodium carbonate which is converted to caustic by treatment with lime is in the relatively low percentage range of about 50% to 70%. It is evident that such a low percentage efficiency results in an excess lime consumption and accordingly in an accompanying additional cost.

In a Bayer liquor system using inside causticization there is an additional drawback that the ratio of caustic to total soda, i.e., sodium carbonate, ranges from about 0.700 to about 0.850. These liquors often also contain a large amount of dissolved sodium carbonate and this dissolved sodium carbonate serves no useful purpose and in fact contributes to the cost of the liquor losses from the process.

Further, the efficiency of the alumina extraction and recovery process is lowered where the ratio of caustic to soda in the main liquor stream is lowered, and, in fact, in some cases the lower ratio requires the lowering of the liquor caustic concentration to values of about 150 grams per liter. The presence of a higher concentration of sodium carbonate in the cycled liquor increases the liquor pumping costs by increasing the liquor viscosity.

A further problem which is frequently introduced when the inside causticization system is employed is that of the introduction of excess water, particularly water which has not passed through the mud washing cycle or has not been otherwise used in some part of the Bayer system. This excess water is introduced in slaking the lime to form a slurry to be fed to the digestion step of the Bayer cycle. When water is introduced in this way the volume of water available for washing the mud is decreased and additional chemical loss results.

One reason for the low efficiency of lime causticization in the inside causticizing circuit is that there is a high degree of reversibility of the reactions taking place due to the presence of relatively high concentrations of caustic and alumina in solution, and also due to the presence of a bauxite residue in these liquors. This bauxite residue coats the particles of lime and prevents them from entering into reaction with the sodium carbonate present in the digester liquor.

In addition inefficiency may also be introduced by certain side reactions which tend to divert or delay the passage of chemicals through the system to produce the desired products. For example, where there is a relatively high concentration of alumina present in the digester at one point when slaked lime is added at that point, calcium aluminate forms by reaction between the lime and dissolved alumina. This calcium aluminate, which is precipitated is also coated with mud or residue and prevented from entering into secondary causticization reaction with sodium carbonate. Excessive alumina loss results from this side reaction.

It is one object of the present invention to provide a method for refining alumina which reduces or eliminates many of the difficulties referred to above.

Another object of the invention is to provide a method of producing alumina at lower cost.

Other objects will be in part apparent and in part pointed out in the description which follows.

This description will be rendered clearer by reference to the accompanying drawings in which.

In one of its broader aspects the objects of this invention are achieved by providing in the Bayer process, in the mud washing cycle thereof, a first and a second side stream of wash liquor separated from said mud, heating the first side stream to a temperature to accelerate reactions therein, and adding unslaked lime thereto with agitation to slake said lime and to causticize the contents of said stream, combining said first and second side streams and agitating the combined fluids to complete the causticization of the mud wash liquor, and passing said causticized liquor through the filtration stage of said Bayer process.

Numerous advantages result from the use of this external causticization cycle as a diverted side stream of the mud washing cycle. A number of these advantages will be made more evident from a description of the specific operation of the process in the examples which follow, although it will be understood that the examples are given primarily for illustrative purposes and are not to be understood as limiting or defining the scope of the invention.

EXAMPLE I

Figure 1:
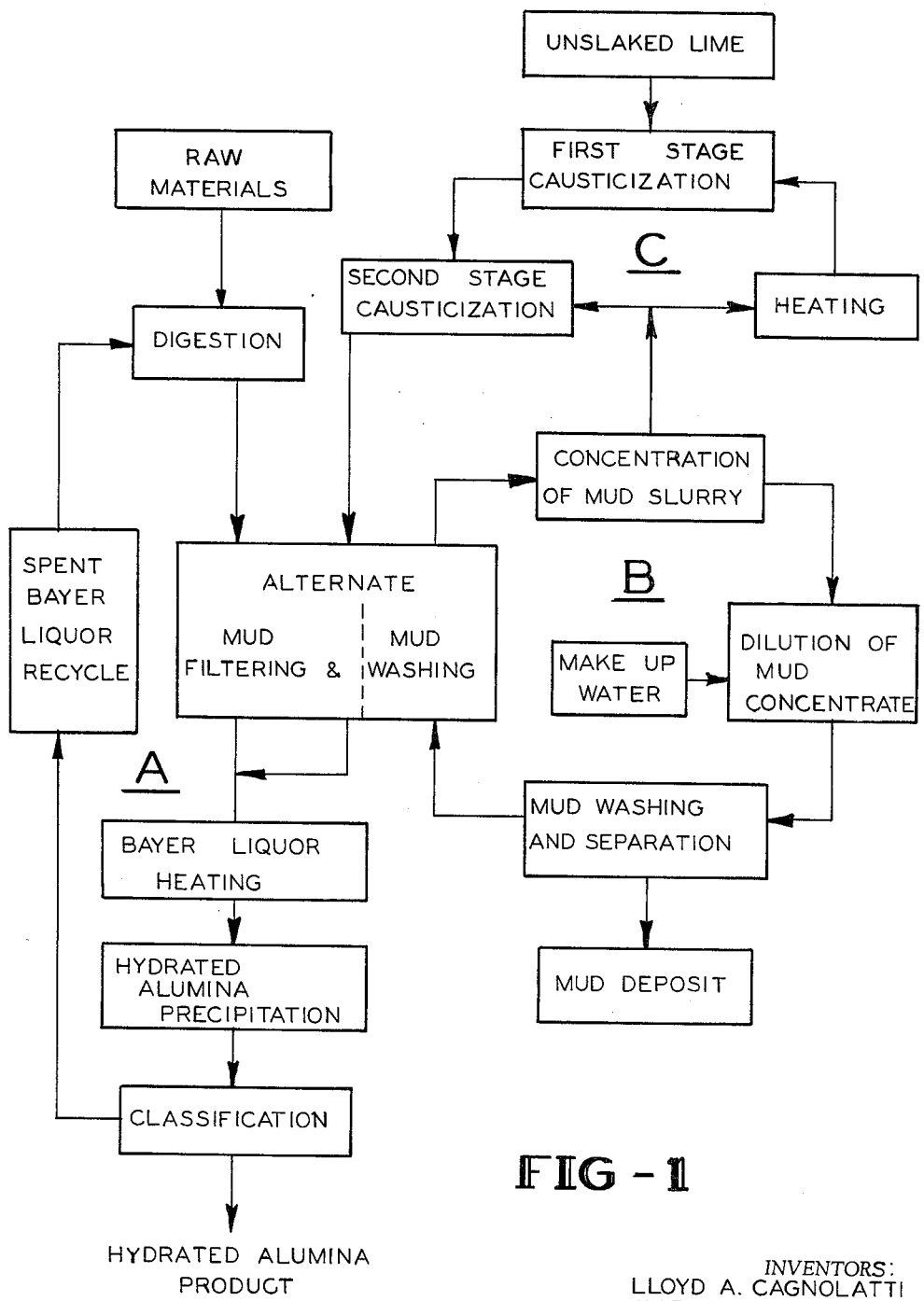
FIGURE 1 is a schematic flow diagram of the process steps and material employed in producing alumina both in accordance with the conventional Bayer cycle practice and in accordance with the improved method taught herein.

Referring now to the figures the conventional Bayer cycle is represented in FIGURE 1 by a one cycle, A, of an overall schematic flow diagram including three processing cycles, indicated as cycles A, B, and C. Cycle A is the conventional cycle in which sodium aluminate solution is produced in the digester from the caustic and bauxite raw materials introduced therein. Undissolved solids are separated as a mud at the filter and the liquor is passed on through the remaining steps of the conventional Bayer process and this cycle, A, is then completed by recycle of the spent Bayer liquor to the digestion step.

Considerable bauxite mud residue is obtained at the filtration step and, for economy, it is necessary to utilize a batchwise sequential counter current water washing system to recover valuable chemicals comprising the Bayer liquor ingredients which remain occluded in the bauxite mud left on the filter as the digester fluid is passed therethrough. Although, in general, the details of the system utilized to recover these valuable chemicals from the mud are varied in accordance with the type of bauxite raw material which is utilized and the processing facilities of specific alumina plants, the primary mode of recovery is by a cycle such as B, which operates essentially independently of, but sequentially with, the primary Bayer liquor treatment cycle to solubilize the occluded chemicals. Conventional processing in cycle B involves a wash treatment of the mud removed from the filter clarification stage, and a combination of the wash liquid with the Bayer liquor which is passed to the heating and other remaining steps of the conventional Bayer cycle. By contrast, in accordance with this invention the liquor is passed to a separate cycle C where it is causticized as described in this example.

Referring now first to cycle B, bauxite mud is removed from the filter press and treated by counter current wash with liquid recycled from a second stage of a mud wash cycle B. There are two wash stages in tandem relation in the mud washing cycle.

In the first stage, mud is washed by flow of wash liquid counter current to the flow of Bayer liquor which takes place during the filtration step, to remove mud from the filter and convert it to a slurry. The mud slurry is separated into a mud concentrate which is sent on to the second wash stage of the mud wash remove mud from the filter and convert it to a slurry. The mud slurry is separated into a mud concentrate, which is sent to the second wash stage of the mud wash cycle B, and a clear liquor overflow which is diverted as a side stream from the mud wash cycle. This diverted side stream of overflow wash liquid may contain from 15 to 20 grams per liter of total soda, from about 5 to 8 grams per liter of sodium carbonate, about 10 to 12 grams per liter of caustic and about 5 to 7 grams per liter of alumina.

To provide lime causticization of the sodium carbonate of this liquor a portion of this side stream of the overflow, comprising about 850 to 2125 pounds per minute (about 100 to 250 gallons per minute), is directed through a heating step to a first stage causticization tank reactor, as indicated in the figure. The liquid of this first portion of the stream is heated to about 210° F. before entering the reactor and unslaked lime is added in controlled weight measures to total approximately 7 to 14 pounds per minute of calcium oxide. Approximately 5 to 10 tons of calcium oxide are added per day in this manner.

The unslaked lime, so added to the heated liquid in the first stage reactor, is slaked as it passes into and through the agitated contents of the reactor. The liquid content of the first stage reactor is maintained at about 60 to 80 percent of reactor capacity by a conventional level control mechanism to thereby provide a reaction time of from 15 to 45 minutes, depending on the rate of liquor flow.

A stream of the liquid product formed in the first stage reactor is removed from the side of the agitated reactor vessel and routed to the second stage stirred reactor vessel where the remaining portion of the washer overflow is also added.

In this second vessel unreacted slaked lime and any calcium aluminate formed in the first reaction vessel is provided with a reaction period of approximately from 15 to 45 minutes to allow causticization of the contents of the remaining portion of the washer overflow by the causticizing ingredients introduced into the first tank reactor. After this reaction period, a portion of the treated liquor is pumped from the second reactor through the filter press, preferably at the end of the filtration cycle of the filter press, to remove and recover a large portion of the sodium aluminate liquor which is left in the bauxite mud at the end of the filter press step of the Bayer cycle. This dilute liquor, after passing through the mud is injected into the main clarified Bayer liquor stream.

In actual plant operation, of course, a number of filter units are employed, so that, although each of the filtering units operates on a batch basis, the overall filtering operation is effectively continuous. It is thus possible to employ an essentially continuous flow of effluent from the second stage causticization to treat mud cake which is deposited in the filter press at the end of the filtration cycle for each such press, and to remove a substantial portion of the valuable chemicals occluded in the mud to return them to a solubilized condition. In particular, a large portion of the sodium aluminate liquor which is left in the bauxite mud at the end of the filter press cycle is removed by this treatment with the causticized mud wash liquid.

From the foregoing it is evident that a highly effective method is provided in accordance with this invention for recovering valuable chemicals from the Bayer process for producing alumina and also for eliminating the buildup of high concentrations of useless chemicals within the recycled Bayer liquid. Essentially the system described herein constitutes an external causticization process in that the causticization is carried out in a processing cycle which is external to the main processing cycle of the Bayer process A.

This external causticization process results in improved causticization efficiency and decreased chemical losses from the mud washing cycle. Alumina losses are minimized by carrying out the causticization essentially in the absence of any bauxite residue, and by providing a secondary reaction vessel where additional liquor to be causticized is fed to promote a secondary reaction between any calcium aluminate formed in the first step, and residual sodium carbonate in the secondary stream.

The improved washing efficiency in the mud washing circuit, using the novel lime causticization system described herein, results due to addition of unslaked lime in the primary causticization step. This addition, besides reducing or eliminating additional water input into the system, results in consumption of water by the formation of calcium hydroxide and this calcium hydroxide reacts in turn with the sodium carbonate present to form the sodium hydroxide needed in the primary Bayer cycle A.

This novel external lime causticization system allows control of the caustic to soda ratio in the main liquor stream of cycle A at about 0.930. No other known Bayer processing cycle employing lime causticization permits maintenance of the caustic to soda ratio at this high control point. Because of the very high ratio of caustic to soda a minimum concentration of sodium carbonate is circulated uselessly throughout the Bayer process.

Essentially the novel system includes in the novel combination the step of causticizing the liquor stream to be used for washing the mud on the filter presses prior to removal of the mud from the presses for the mud washing cycle B. Because the mud on the filter presses is washed with causticized liquor prior to removal from the presses, there is an increased stability in this wash stream, i.e., a reduced tendancy of the alumina to precipitate.

Causticization changes sodium carbonate to caustic, and as caustic concentration increases, alumina to caustic ratio decreases. Stability (or tendency for alumina to precipitate) varies inversely with alumina to caustic ratio. As also indicated, use of this novel system results in decrease of alumina losses, decreases of filter cloth consumption, improved filter operation, and a reduction in the scale formation with the accompanying reduction in the maintenance cost of the Bayer processing cycle apparatus.

It is evident from the foregoing that the process taught herein provides a unique method for increasing the economical operation of the Bayer process and that this operation depends on a novel combination of operations which provide in turn the advantages described above. It is believed further apparent that although the process has been described with reference to the combination of steps found to yield a desirable improvement in the economy of operation of the Bayer process, modifications can be made in a number of the individual operating steps, and, to a limited degree, in the particular combination made in carrying out the process.

For example, the cycle C might be operated by drawing off the clear filtrate from the mud cake wash of the filter presses. In other words, instead of using the overflow from the first stage of the mud wash cycle, the liquid which is employed at the end of the filtration cycle to wash the filter cake which remains on the filter press, in order to remove occluded chemicals, may be used as the liquid supplied to the two-stage causticization cycle C.

This liquor stream, due to its enrichment as a result of washing the occluded concentrated Bayer liquor from the mud cake in the filter press, would contain a somewhat higher soda content than the overflow liquid from the mud wash cycle, and this higher soda content would allow an increased conversion of sodium carbonate to caustic in the causticization steps of the causticization cycle C. This filter cake washing step is, of course, a necessary step for recovery of chemicals from the mud.

In carrying out the present process employing a separate two-stage causticization cycle it is also possible to produce caustic at a cost below the cost of caustic produced by the electrolytic process by the addition of sodium carbonate to the liquor introduced into the causticization cycle, C, taught herein. It is possible in this way to produce a portion of the caustic being consumed in the main Bayer cycle A below the cost of the caustic ordinarily introduced into this cycle. In order to carry out this variation, mud cake wash liquor is fortified by the addition of sodium carbonate prior to introduction into the lime causticization cycle, and this added sodium carbonate is causticized to convert it to caustic in the normal operation of this two-stage cycle, C. When this alternative is employed, the wash liquid, which is commonly called "weak wash" after it has been used to wash the filter cake because it is a clearer liquid, is put in use in the causticization cycle, and accordingly there is less bauxite mud present in the lime causticizing cycle to coat the solid reactants and prevent or retard their reaction with the dissolved contents of the liquor being treated. Clearer liquors taken in this alternative manner would contain between 15 and 40 grams per liter of total soda with about 8 to 15 grams per liter of sodium carbonate and between 15 and 30 grams per liter of caustic, in addition to the 5 to 10 grams per liter of alumina.

In the use of this alternative scheme for combining the two-stage cycle, C, into the Bayer process, when it is found desirable to fortify this weak wash liquor with sodium carbonate for production of additional caustic by lime causticization in the separate causticization cycle C, the sodium carbonate content of this filtered wash liquor may be increased to as high as 85 grams per liter without seriously reducing the efficiency of this lime causticization. The rate of flow of filtered liquor to the lime causticization system, employing this variation, ranges between about 250 and 400 gallons per minute depending on the quantity of caustic which is to be produced. The temperature of the stream employed in the first stage of the causticization cycle remains in the range of 200 to 210° F.

It will be appreciated that the alternative procedure described herein provides a unique economy in the treatment of liquors associated with the Bayer process to provide effective causticization thereof. Thus, in general a dilute clarified wash liquor stream is divided and a first portion having about 15 to 40 grams per liter total soda concentration is heated to about 200° F. and is causticized by addition of unslaked lime in an atmospheric stirred tank reactor. The effluent from this first stage atmospheric reactor is fed to a second stage stirred tank reactor where the remaining portion of the wash liquor is combined therewith to accomplish the additional causticization, and to give higher efficiency in the causticization step with a reduction in the alumina losses. In this second stage stirred tank reactor calcium aluminate and any excess calcium hydroxide present reacts with sodium carbonate to resolubilize alumina as sodium aluminate and to precipitate calcium carbonate.

Figure 2:
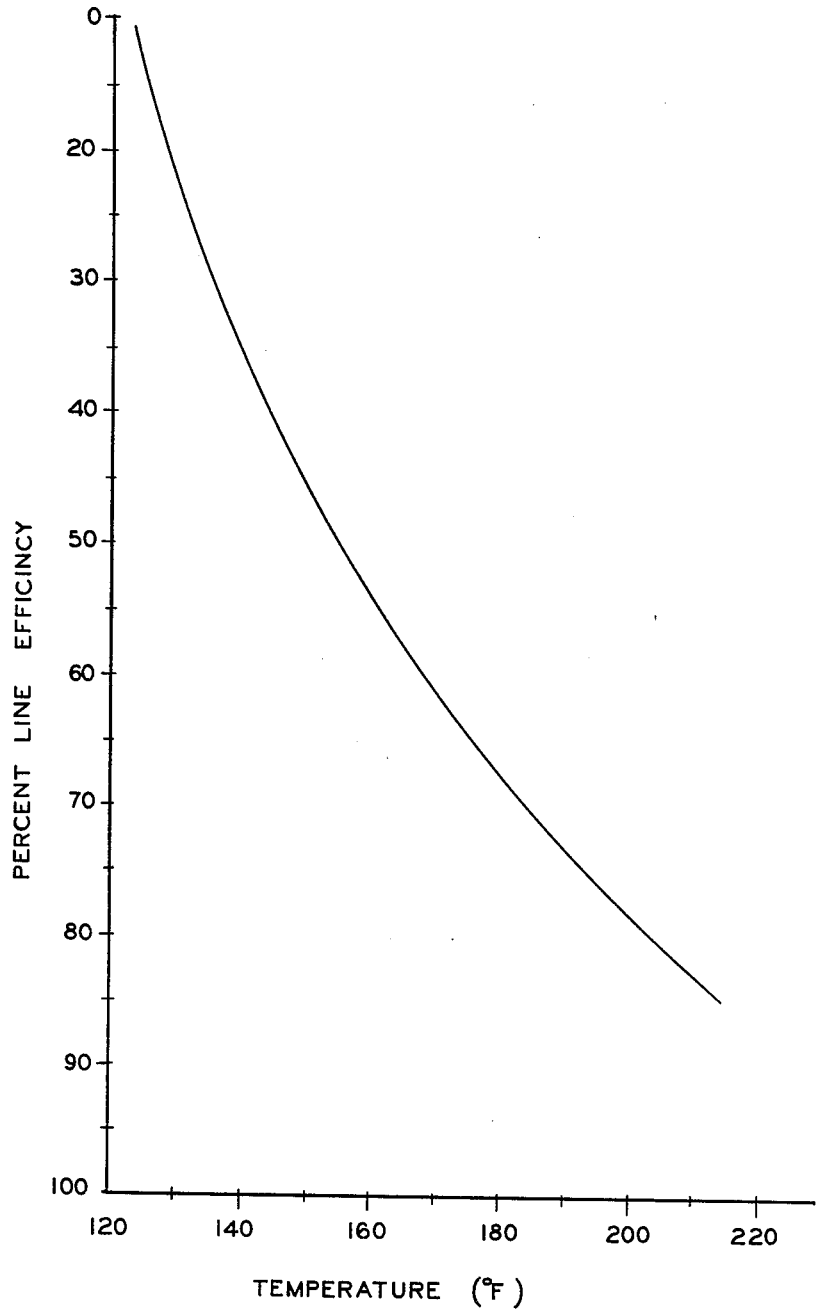
FIGURE 2 is a graph in which the percent of lime efficiency is plotted as ordinate against the temperature of the reacting composition as abscissa where the reaction time is ten minutes.
Figure 3:
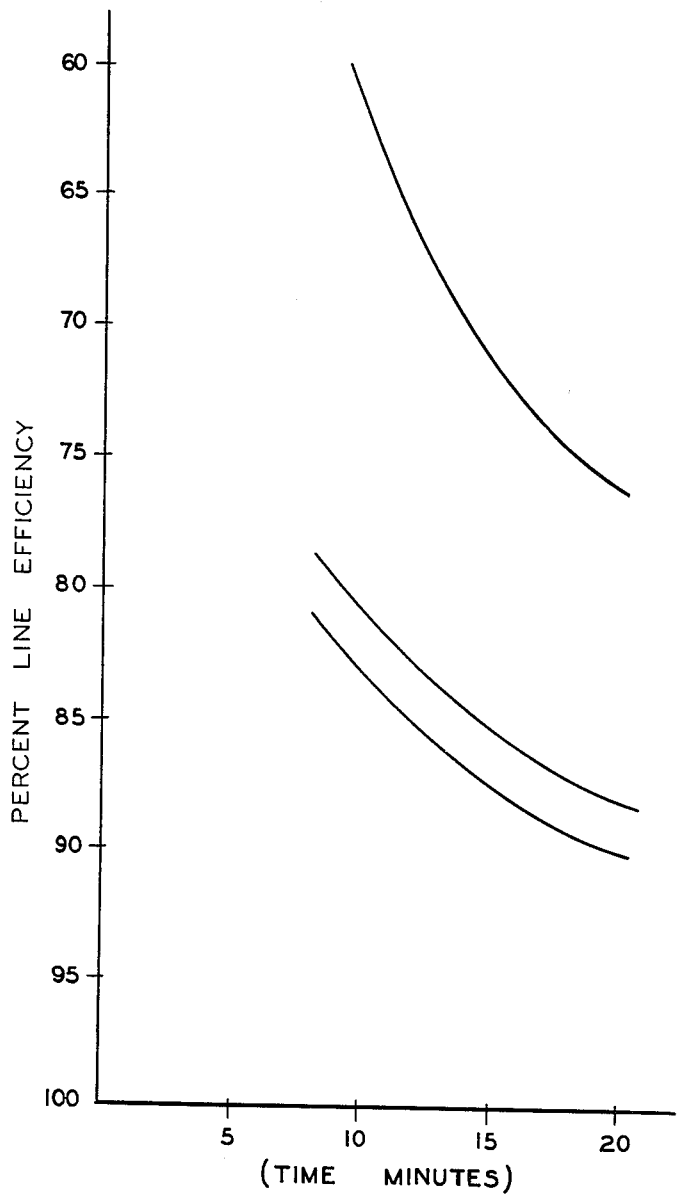
FIGURE 3 is a graph showing the relationship between the percent of lime efficiency and the time in minutes during which the reaction has proceded at a number of different reaction temperatures.

The number of additional advantages of the methods described herein will be more evident from a consideration of the relationship between the lime efficiency and the temperature and time of reaction as illustrated in the accompanying FIGURES 2 and 3. Referring first particularly to FIGURE 2 it is evident that there is a very distinctive increase in the efficiency of the lime in causticization reaction with increasing temperature. One of the unique features of this invention is that this high efficiency of the causticization reaction is obtained although only a first portion of the liquid in the causticizing cycle C is heated to the temperature at which high percentage lime efficiency is indicated to be obtained. It had not previously been thought possible to achieve a high efficiency causticization without heating all of the liquor employed in the causticizing step to the temperature at which high lime efficiency is obtained. However, it has been found possible to achieve the high efficiency by use of the two-stage treatment cycle as described above in combination with wash liquors.

Referring now particularly to FIGURE 3, an additional feature of the invention is found in the use of the stirred tank reactor to provide a reaction residence time for the chemicals treated in each of the stages of the two-stage causticization cycle through the use of the stirred tank reactors with a controlled rate of withdrawal of the treated liquor.

Since many examples of the foregoing procedures and apparatus may be carried out and made and since many modifications can be made therein without departing from the scope of the subject invention, the foregoing is to be interpreted as illustrative only and not as defining or limiting the scope of the invention.

What is claimed is the following:

1. In the method of beneficiating alumina ore by the Bayer process, the improvement which comprises providing a mud slurry in the mud washing cycle, separating a first and a second side stream of wash liquor from said mud slurry, heating the first such side stream, and adding unslaked lime thereto with agitation to slake said lime and to causticize the contents of said stream, combining said first and second side streams and agitating the combined fluids to complete the causticization of the mud wash liquor, and passing said causticized liquor through the filtration stage of said Bayer process.

2. The method of claim 1 in which the first stream of wash liquor is heated to about 210° F.

3. The method of claim 1 in which the first stream of wash liquor is heated to about 210° F. for about fifteen minutes.

4. In the process of beneficiating alumina ore by the Bayer process, the improvement which comprises washing the mud cake formed by filtration of digested alumina ore to remove occluded Bayer liquor from said cake, forming a first and a second stream of this wash liquor, heating the first stream, adding unslaked lime thereto with agitation to slake said lime and to causticize the contents of said stream, combining said first and second streams and agitating the combined fluids to complete the causticization of the mud wash liquor, and combining this causticized fluid with the filtered Bayer liquor.

5. The method of claim 4 in which sodium carbonate is added to the wash liquor before causticization to bring the concentration of the sodium carbonate up to a value below about 85 grams per liter.

6. The method of claim 4 in which the heating is to a temperature of about 210° F.

7. The method of claim 4 in which the heating is to a temperature of about 210° F. and the causticization reaction time is between 15 and 45 minutes.

References Cited by the Examiner

UNITED STATES PATENTS

| 2,375,343 | 5/45 | Brown | 23—141 |
| 2,992,893 | 7/61 | Soudan et al. | 23—143 |

FOREIGN PATENTS

| 506,885 | 6/39 | Great Britain. |

MAURICE A. BRINDISI, *Primary Examiner.*